Jan. 16, 1951  J. M. BOOE  2,538,078
POTENTIAL PRODUCING CELL
Filed Oct. 15, 1947
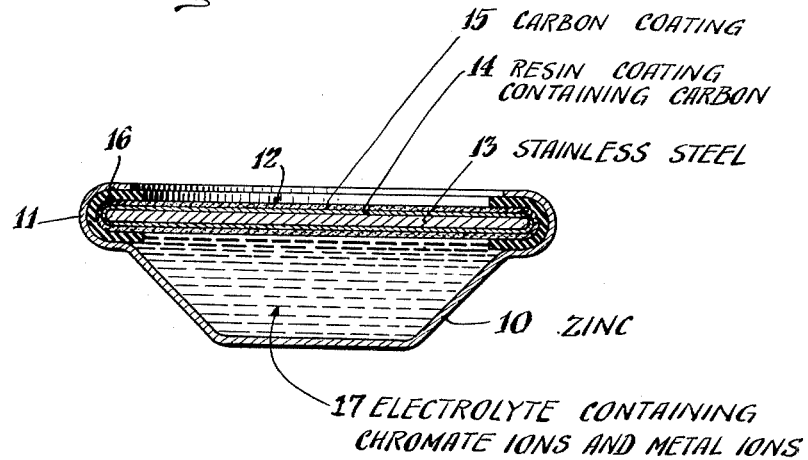
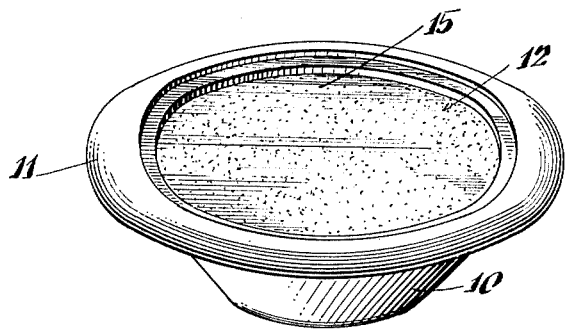
INVENTOR
James M. Booe
BY
Nicholas Lang
ATTORNEY Patented Jan. 16, 1951

2,538,078

UNITED STATES PATENT OFFICE 2,538,078

POTENTIAL PRODUCING CELL

James M. Booe, Indianapolis, Ind., assignor to P. R. Mallory & Co., Inc., Indianapolis, Ind., a corporation of Delaware Application October 15, 1947, Serial No. 779,974

12 Claims. (Cl. 136—104)

This invention relates to potential producing cells and to a novel electrolyte and terminal construction therefor.

I have found that the difficulties encountered with conventional potential producing cells can be overcome or greatly minimized by using the principles of the present invention. My novel potential producing cells may be readily manufactured and operate efficiently at subzero temperatures. In addition, a relatively high voltage is produced and this voltage remains constant over extended periods of time. These advantages are attributable, to a large extent, to my novel electrolyte which includes sufficient chromate ions to function as an efficient depolarizing agent, and has a pH considerably higher than theretofore employed whereby corrosion of the anode is substantially inhibited. A metal salt is also present in the electrolyte which acts to buffer the solution to a slightly acidic range. Thus, my novel electrolyte is distinguished from conventional electrolytes, such as that of the Poggendorff cell, by its sharply higher pH value and by the presence of a substantial concentration of a metal salt. These factors combined with the use of chromate ions as a depolarizer provide a cell having a relatively high output voltage which remains constant over extended periods of time.

The novel cathode construction of this invention contributes greatly to the ease of manufacture and improved voltage characteristics of the cell. This cathode comprises a conductive metal base, preferably a disc of stainless steel, which has a first coating thereon of resinous material, such as a vinyl resin, intermixed with carbon together with a second coating of pure carbon. The completed cathode is nonporous and, hence, highly resistant to moisture or excessive humidity, and electrical contact may be easily made to the base. Further, the preparation of the steel base may be more readily accomplished than that of other materials previously used as cathodes.

Accordingly, it is an object of the invention to improve the construction and operation of potential producing cells.

It is a further object of the invention to provide a cell which is easy to manufacture, which is efficient in operation at low temperatures and which has a stable output voltage over extended periods of time higher than that of cells previously utilized.

It is a still further object of the invention to provide a novel electrolyte for a potential-producing cell which maintains a steady output voltage under no load conditions.

The invention likewise contemplates a novel cathode construction which is adaptable both to potential producing cells and ordinary primary cells.

Various other objects, features and advantages of the invention will become apparent from the following detailed description taken in conjunction with the appended drawing in which:

Figure 1 is a vertical, sectional view showing a primary cell constructed in accordance with the present invention; and Figure 2 is a perspective view of the cell shown in Figure 1.

While a preferred embodiment of the invention is described herein, it is contemplated that considerable variation may be made in the method of procedure and the construction of parts without departing from the spirit of the invention.

In accordance with the principles of this invention, the novel potential producing cell comprises a cathode of inert conductive material preferably constructed in the manner to be explained in detail hereafter.

The anode of the cell is composed of a metal, such as zinc or cadmium, which is electronegative in character and is adapted to produce a potential when utilized with a cathode of inert material. In accordance with the invention, a novel electrolyte, which is preferably aqueous and nonhygroscopic, is disposed in contact with the anode and cathode, this electrolyte including sufficient chromate ions to serve as an efficient depolarizer to maintain the electromotive force of the cell. The concentration of chromate ions may vary from .1 gram per liter to a saturated solution depending upon the cation with which the chromate ion is associated. The chromate ion may be added to the electrolyte in the form of chromic acid in a concentration of .1 to 100 grams per liter or, alternatively, in the form of potassium dichromate in a concentration of 1 gram per liter to a saturated solution. In both cases, the preferred concentration is 60 grams per liter and the preferred range for commercial use is 25 to 100 grams per liter.

In accordance with the invention, the electrolyte has a pH which is insufficient to cause excessive corrosion of the metal anode. In this manner, the cell is adapted to provide a desired potential or voltage, for example, to provide grid bias in an electron tube circuit, without delivering current to the circuit with which it is associated. To this end, the pH of the electrolyte should be kept between 3 and 7, preferably at 3.5. When the chromate ion is added in the form of chromic acid in a concentration of over .5 gram per liter, the pH is initially below 3.0. However, after a short period, the pH rises to at least 3.0 due to reaction of the chromic acid with the anode material.

In order to stabilize or buffer the electrolyte at the desired pH value and afford improved operation of the cell at low temperatures, I add a substantial amount of a metal salt to the electrolyte. The salt used is preferably one incorporating the anode metal or, alternatively, any metal higher than the anode metal in the electrochemical series. A further requirement is that the metal salt used shall be sufficiently stable as to be nonreactive with the chromate or dichromate ion. Where a zinc anode is used, zinc is the preferred metal constituent of the salt, although magnesium, sodium, aluminum, lithium, and other metals higher than zinc in the electromotive series may be used. Where a cadmium anode is used, cadmium is the preferred metal constituent of the salt, although other metals higher in the electromotive series, such as zinc, magnesium and sodium, may be used. Generally speaking, stable anions such as sulfates, nitrates, phosphates and fluoborates may be used but halides are, in general, too reactive to provide satisfactory results. In other words, the salts contemplated by the present invention are those incorporating a metal which is above the anode metal in the electrochemical series and which is substantially inert with respect to chemical reaction with the chromate or dichromate ion together with a stable anion of an inorganic acid, excluding chlorides.

The concentration of metal salt included in the electrolyte may vary from 1 gram per liter to saturation although a sufficient quantity should be used to provide adequate buffering of the electrolyte. In general, satisfactory commercial results are obtained when the salt concentration is between 100 and 200 grams per liter. The preferred metal salt is zinc sulfate having a concentration of 1 gram per liter to saturation, preferably 180 grams per liter, and satisfactory commercial results are secured when the zinc sulfate concentration is between 100 and 200 grams per liter.

The cell constructed in accordance with the foregoing description delivers approximately 1.5 volts over extended periods of time and the life expectancy of such cells is limited only by evaporation of water from the aqueous electrolyte, since the electrolyte is substantially nonhygroscopic. The voltage may vary slightly, however, responsive to changes in the pH of the electrolyte.

Especially advantageous results are obtained when the novel electrolyte of this invention is utilized with the cell structure disclosed in the drawings in which reference character 10 denotes a zinc or cadmium cup having a flanged portion 11 at the open end thereof, this cup serving as the anode of the cell.

A novel cathode assembly 12 is positioned in the open end of the cup and this cathode comprises a metal base 13 which has applied thereto a resinous carbon-containing coating 14 and a second coating 15 of colloidal graphite. Preferably, the base 13 is a disc of 18-8 stainless steel which may be punched from sheet material and tumbled to remove burrs or rough edges. During the tumbling operation, the steel discs are heated to a temperature of 175° C. and sprayed with a solution composed of a resinous material mixed with colloidal carbon to form the coating 14. The thickness of the coating may be controlled by applying a given amount of solution to a definite number of discs. After application of the resinous carbon coating 14, the discs are maintained at the aforesaid temperature for one hour to bake the coating. Thereupon, the discs are sprayed with a solution of colloidal graphite while the tumbling operation continues to provide the second coating 15. The cathode is then placed into the open flanged portion 11 of the cup 10 and the cell is hermetically sealed by a packing ring 16 of resilient material to inhibit evaporation of the aqueous electrolyte 17.

Alternatively, the carbon coatings may be applied to the base 13 by spreading the discs on a heated plate and spraying only the electrolyte-contacting surface of the discs with the coating material while leaving the lower surface of the discs uncoated. It is to be understood that other methods of applying the coating which will occur to those skilled in the art are included within the scope of the invention.

It is believed that the effect of the carbon coating is to catalyze the depolarizing action of the chromate ion. The steel disc 13 cooperates with the carbon to provide an impervious electrode thereby preventing evaporation of the aqueous electrolyte. Although, in some cases, a single coating of carbon upon the disc 13 may be sufficient, it has been found that the use of two coatings in the manner described is very advantageous in catalyzing the depolarizing action of the chromate ion. The nonporous nature of the steel disc 13 and the hermetic sealing effected by packing ring 16 provide outstanding resistance to severe conditions of moisture or high humidity. Furthermore, the steel disc allows electric contact to be readily made to the cathode and this cathode may be easily and conveniently formed and assembled into the cell. The output voltage has been found to be very uniform and, in actual manufacture of the cells, it is unnecessary to check each cell for output voltage.

What is claimed as new and desired to be secured by Letters Patent is:

1. A sealed potential producing cell for providing a constant potential for long periods of time in the absence of appreciable current drain therefrom, which comprises a cathode of inert conductive material, a zinc anode, and an electrolyte free from halides in contact with said anode and cathode, said electrolyte including from .1 gram per liter to a saturated solution of chromate ion as a depolarizer and having a pH between 3 and 7 whereby corrosion of said anode by the electrolyte is substantially inhibited.

2. A sealed potential producing cell for providing a constant potential for long periods of time in the absence of appreciable current drain therefrom, which comprises a cathode of inert conductive material, an anode of metal selected from the group consisting of zinc and cadmium, and an electrolyte free from halides in contact with said cathode and anode; said electrolyte having a pH between 3 and 7 and comprising from .1 gram per liter to a saturated solution of chromate ion, and a sufficiently high concentration of a salt of a metal with an inorganic acid, said metal having a position in the electromotive series at least as high as the anode metal and said salt being substantially inert with respect to chromate ions.

3. A sealed potential producing cell for providing a constant potential for long periods of time in the absence of appreciable current drain therefrom, which comprises a carbon cathode, a zinc anode, and an electrolyte free from halides in contact with said anode and said cathode; said electrolyte having a pH between 3 and 7 and comprising chromate ions, and an effective amount of a salt of zinc with an inorganic acid which is substantially non-reactive with chromate ions.

4. A sealed potential producing cell for providing a constant potential for long periods of time in the absence of appreciable current drain therefrom, which comprises a carbon cathode, a zinc anode, and an aqueous electrolyte free from halides in contact with said anode and said cathode; said electrolyte comprising from .1 gram per liter to a saturated solution of chromate ion and from .1 gram per liter to a saturated solution of zinc sulphate, the relative concentrations of chromate ion and of zinc sulphate in the electrolyte being so determined as to stabilize the pH of the electrolyte between 3 and 7.

5. A sealed potential producing cell for providing a constant potential for long periods of time in the absence of appreciable current drain therefrom, which comprises a carbon cathode, a zinc anode, and an electrolyte free from halides in contact with said anode and said cathode; said electrolyte comprising from .1 to 100 grams per liter of chromic acid and from 1 gram per liter to a saturated solution of zinc sulphate, the relative concentrations of chromic acid and zinc sulphate in the electrolyte being so determined as to stabilize the pH of the electrolyte between 3 and 7.

6. A sealed potential producing cell for providing a constant potential for long periods of time in the absence of appreciable current drain therefrom, which comprises a carbon cathode, a zinc anode, and an electrolyte free from halides in contact with said anode and said cathode; said electrolyte comprising from 1 gram per liter to a saturated solution of potassium dichromate and from 1 gram per liter to a saturated solution of zinc sulphate, the relative concentrations of potassium dichromate and zinc sulphate in the electrolyte being so determined as to stabilize the pH of the electrolyte between 3 and 7.

7. A sealed potential producing cell for providing a constant potential for long periods of time in the absence of appreciable current drain therefrom, which comprises a carbon cathode, a zinc anode, and an aqueous electrolyte free from halides in contact with said anode and said cathode; said electrolyte comprising about 60 grams per liter of chromic acid and about 180 grams per liter of zinc sulphate and having a pH between 3 and 7.

8. A sealed potential producing cell for providing a constant potential for long periods of time in the absence of appreciable current drain therefrom, which comprises a carbon cathode, a zinc anode, and an aqueous electrolyte free from halides in contact with said anode and said cathode; said electrolyte comprising about 60 grams per liter of potassium dichromate and about 180 grams per liter of zinc sulphate and having a pH between 3 and 7.

9. A sealed potential producing cell for providing a constant potential for long periods of time in the absence of appreciable current drain therefrom, which comprises an anode selected from the group consisting of zinc and cadmium, a cathode comprising a base of conductive metal having a coating of carbon thereon, and an electrolyte free from halides in contact with said anode and said cathode; said electrolyte having a pH between 3 and 7 and comprising from .1 gram per liter to a saturated solution of chromate ion and from 1 gram per liter to a saturated solution of a salt of the anode metal with an inorganic acid which is substantially non-reactive with chromate ions.

10. A sealed potential producing cell for providing a constant potential for long periods of time in the absence of appreciable current drain therefrom, which comprises a zinc anode; a cathode consisting of a base of conductive metal, a first coating of resinous material containing carbon on said base, and a second coating of pure carbon on said first coating; and an electrolyte free from halides in contact with said anode and said cathode; said electrolyte having a pH between 3 and 7 and comprising chromate ions and an effective amount of a salt of zinc with an inorganic acid which is substantially non-reactive with chromate ions.

11. A sealed potential producing cell for providing a constant potential for long periods of time in the absence of appreciable current drain therefrom, which comprises a carbon cathode, a zinc anode, and an electrolyte free from halides in contact with said anode and said cathode; said electrolyte comprising from 25 to 100 grams per liter of chromic acid and from 100 to 200 grams per liter of zinc sulphate and having a pH between 3 and 7.

12. A sealed potential producing cell for providing a constant potential for long periods of time in the absence of appreciable current drain therefrom, which comprises a carbon cathode, a zinc anode, and an electrolyte free from halides in contact with said anode and said cathode; said electrolyte comprising from 25 to 100 grams per liter of potassium dichromate and from 100 to 200 grams per liter of zinc sulphate and having a pH between 3 and 7.

JAMES M. BOOE.

REFERENCES CITED

The following references are of record in the file of this patent:

UNITED STATES PATENTS

| Number | Name | Date |
|---|---|---|
| 436,001 | Irving et al. | Sept. 9, 1890 |
| 1,920,151 | Ruben | July 25, 1933 |
| 2,001,978 | Ruben | May 21, 1935 |
| 2,023,717 | Willimek | Dec. 10, 1935 |
| 2,116,091 | Williams | May 3, 1938 |
| 2,154,312 | MacCallum | Apr. 11, 1939 |
| 2,343,194 | Lawson | Feb. 29, 1944 |
| 2,399,127 | Lipinski | Apr. 23, 1946 |

FOREIGN PATENTS

| Number | Country | Date |
|---|---|---|
| 10,233 | Australia | 1932 |
| 804,995 | France | Aug. 17, 1936 |